(12) United States Patent
Cardenas

(10) Patent No.: US 11,612,117 B1
(45) Date of Patent: Mar. 28, 2023

(54) CONTROLLABLE HIGH-PRESSURE AEROPONICS SYSTEM

(71) Applicant: Juan Cardenas, Tehachapi, CA (US)

(72) Inventor: Juan Cardenas, Tehachapi, CA (US)

( * ) Notice: Subject to any disclaimer, the term of this patent is extended or adjusted under 35 U.S.C. 154(b) by 312 days.

(21) Appl. No.: 16/591,123

(22) Filed: Oct. 2, 2019

(51) Int. Cl.
*A01G 31/02* (2006.01)
*B05B 12/04* (2006.01)
*B05B 9/04* (2006.01)

(52) U.S. Cl.
CPC ............ *A01G 31/02* (2013.01); *B05B 9/0403* (2013.01); *B05B 12/04* (2013.01)

(58) Field of Classification Search
CPC .... A01G 31/02; A01G 27/003; B05B 9/0403; B05B 12/04
See application file for complete search history.

(56) References Cited

U.S. PATENT DOCUMENTS

| | | | | |
|---|---|---|---|---|
| 3,807,088 A * | 4/1974 | Jones | ..................... | A01G 31/02 47/62 N |
| 4,332,105 A * | 6/1982 | Nir | ......................... | A01G 31/02 47/1.01 R |
| 2010/0218423 A1* | 9/2010 | Walhovd | ................ | A01G 31/02 47/62 A |
| 2019/0223395 A1* | 7/2019 | Warrick | .................. | A01G 9/027 |
| 2019/0246584 A1* | 8/2019 | Hsueh | ..................... | A01G 31/02 |
| 2019/0357458 A1* | 11/2019 | Cordoba | ................ | A01G 31/02 |
| 2020/0137964 A1* | 5/2020 | Bouchard | ............... | H04W 4/80 |
| 2020/0163297 A1* | 5/2020 | Newitt | ................. | F24F 11/0008 |

\* cited by examiner

*Primary Examiner* — Justin M Jonaitis
(74) *Attorney, Agent, or Firm* — R. Scott Kimsey, Esq.

(57) ABSTRACT

An aeroponics system includes a spray manifold with a fluid inlet, a plurality of fluid injectors attached to the spray manifold and in fluid communication therewith, and a fluid pump in communication with the fluid inlet of the spray manifold. A timing controller is in electronic communication with the plurality of fluid injectors. A power source is in electronic communication with the fluid pump, the plurality of fluid injectors, and the timing controller. The fluid pump is configured to maintain a constant high pressure within the spray manifold. The timing controller is configured to control the timing and pattern of energization of the plurality of fluid injectors. When any one of the plurality of fluid injectors is energized, fluid is allowed to pass from the spray manifold through that fluid injector.

1 Claim, 6 Drawing Sheets

CONTROLLABLE HIGH-PRESSURE AEROPONICS SYSTEM

RELATED APPLICATIONS

Not Applicable

BACKGROUND OF THE INVENTION

1. Field of the Invention

The present system relates generally to the field of aeroponics, and more specifically to a controllable, high-pressure aeroponics system for delivering water and nutrients to aeroponically-grown plants.

2. Background

Systems for growing plants outside of a soil environment are known in the art. In hydroponic systems, for example, plants are grown in a water-based nutrient solution. The root systems of the plants are supported on an inert medium. The roots of the plants come into direct contact with the nutrient solution, allowing the ready absorption of water and nutrients. Use of such systems requires monitoring and balancing such variables as the pH of the solution, nutrient concentrations, and the like.

Aeroponic systems are more recent and offer advantages over hydroponic systems. In an aeroponic system, plant root material is typically misted with a nutrient solution while suspended in air. The misting may be accomplished with fine spray nozzles or "pond foggers." The resulting systems use less water than hydroponic systems, and also use less nutrient solution because the nutrients are not being dispersed in a pool of water for uptake by plant roots, but are instead dispersed only into the relatively small amount of water-based solution being misted on the plant. While this is an efficient growth method, inefficiencies persist in terms of delivery of nutrient solution and water.

SUMMARY OF THE INVENTION

One embodiment of the present disclosure provides an aeroponics system having a spray manifold with a fluid inlet, a plurality of fluid injectors attached to the spray manifold and in fluid communication therewith, and a fluid pump in communication with the fluid inlet of the spray manifold. A timing controller is in electronic communication with the plurality of fluid injectors. A power source is in electronic communication with the fluid pump, the plurality of fluid injectors, and the timing controller. The fluid pump is configured to maintain a constant high pressure within the spray manifold. The timing controller is configured to control the timing and pattern of energization of the plurality of fluid injectors. When any one of the plurality of fluid injectors is energized, fluid is allowed to pass through the fluid injector and is sprayed from the tip of the fluid injector.

Another aspect of the present disclosure provides a housing defining an interior space therein for the disposition of plant root material within. The injectors are positioned such that fluid passing through the injectors is directed to the interior space of the housing.

In another aspect of the disclosure the fluid injectors are automotive fuel injectors.

In another aspect of the disclosure a pressure regulator is provided in communication with the fluid pump.

In another aspect of the disclosure a plurality of valves are provided, each valve disposed between one of the fluid injectors and the spray manifold. When the fluid injector is detached from the manifold the valve seals the opening in the spray manifold and prevents leaking.

Another aspect of the disclosure provides a root separator extending through the interior space of the housing for separating a mass of plant root material within.

In another aspect of the present disclosure an aeroponics system includes a fluid source and a spray manifold in fluid communication with the fluid source. A fluid pump is provided for delivering fluid from the fluid source to the spray manifold. An injector is attached to the spray manifold and is in fluid communication therewith. A timing controller is in fluid communication with the injector. The timing controller is configured to control the timing of the injector. When the injector is energized fluid is allowed to pass through the injector and is sprayed from the tip of the injector.

DETAILED DESCRIPTION OF THE INVENTION

The present disclosure provides an aeroponic system utilizing constant high pressure and electronic injectors (such as, for example, electronic fuel injectors) controlled by a timer to ensure complete control over spray times and patterns.

Figure 1:
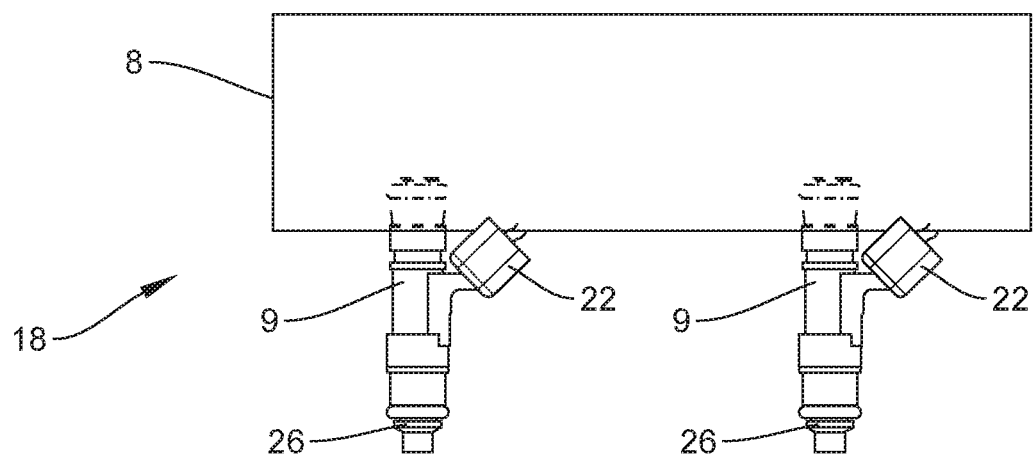
FIG. 1 is a top view of a spray manifold and injectors of one embodiment of an aeroponics system of the present disclosure.

Turning to the drawings, wherein like numerals indicate like parts, FIG. 1 depicts some of the components of one exemplary embodiment of the aeroponics system 18 of the present disclosure. Aeroponics system 18 includes a spray manifold 8 into which a nutrient solution may be directed, a fluid pump, a pressure regulator, injectors 9, and a power source. Injectors 9 each include an electrical connection 22 and a spray tip 26. The fluid pump 12, pressure regulator 10, and power source 1 are depicted schematically in FIG. 4. Spray manifold 8 may be disposed within a tray or other container for containing the root system environment of the plants being grown. The plants are preferably held in place via inert media, and it is contemplated that any suitable container, enclosure, or other structure may be utilized for housing the plant root environment. Structures used for such purposes are known within the aeroponics art.

In one embodiment of an aeroponics system of the present invention, fluid pump 12 operates to introduce nutrient solution into spray manifold 8 at high pressure. A pressure regulator 10 functions to raise or lower the pressure according to the needs or desires of an operator of the present system. In an exemplary embodiment, pressure may be set at about 45 psi. In other embodiments, the pressure may range from 45 psi to about 90 psi. When the desired level of pressure has been established within spray manifold 8, fluid pump 12 and pressure regulator 10 work together to maintain that pressure at all times during which the system has power. Other embodiments of the present system may utilize a 60 psi on-demand pump having a built-in pressure regulator, eliminating the need for a separate pressure regulator.

With the desired pressure maintained within spray manifold 8, injectors 9 may be actuated according to a timing and pattern predetermined by the user. Timing of injection of the nutrient solution onto the plants grown with the aeroponic system will vary depending on the type of plants being grown. Timing controller 2 may, for example, operate over a range of timing from about 0.05 to about 1 seconds. During this time interval, when injectors 9 are in the open configuration, the pressure within spray manifold 8 forces nutrient solution out through the injector nozzle at high pressure. In some embodiments of the present system, each of the fluid injectors 9 may be capable of being isolated by a user of the aeroponic system, such that individual injectors can be removed and/or replaced without powering down the entire system.

Figure 2:
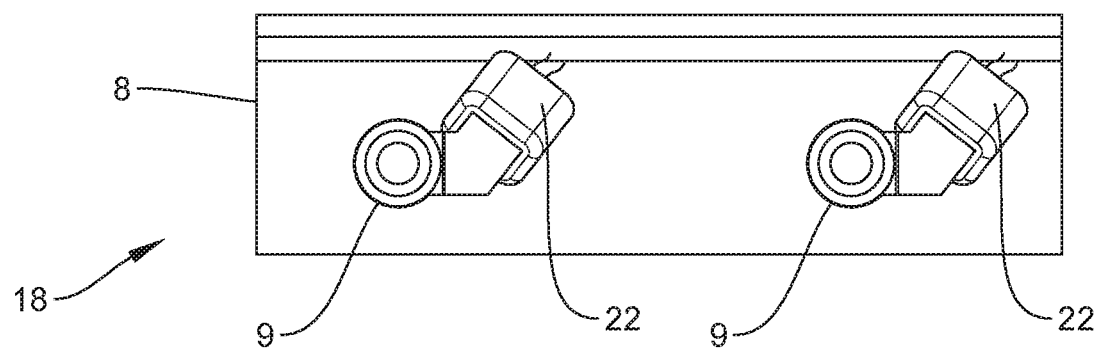
FIG. 2 is a side view of a spray manifold and injectors of one embodiment of an aeroponics system of the present disclosure.
Figure 3:
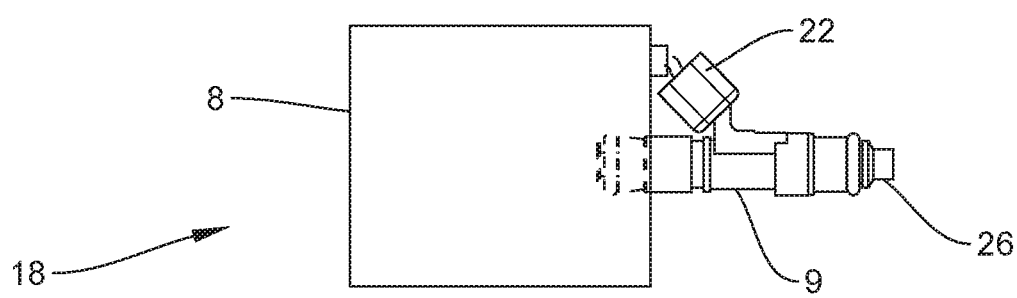
FIG. 3 is an end view of a spray manifold and injectors of one embodiment of an aeroponics system of the present disclosure.

FIGS. 2 and 3 show a side view and end view, respectively, of the components of an aeroponic system shown in FIG. 1.

Figure 4:
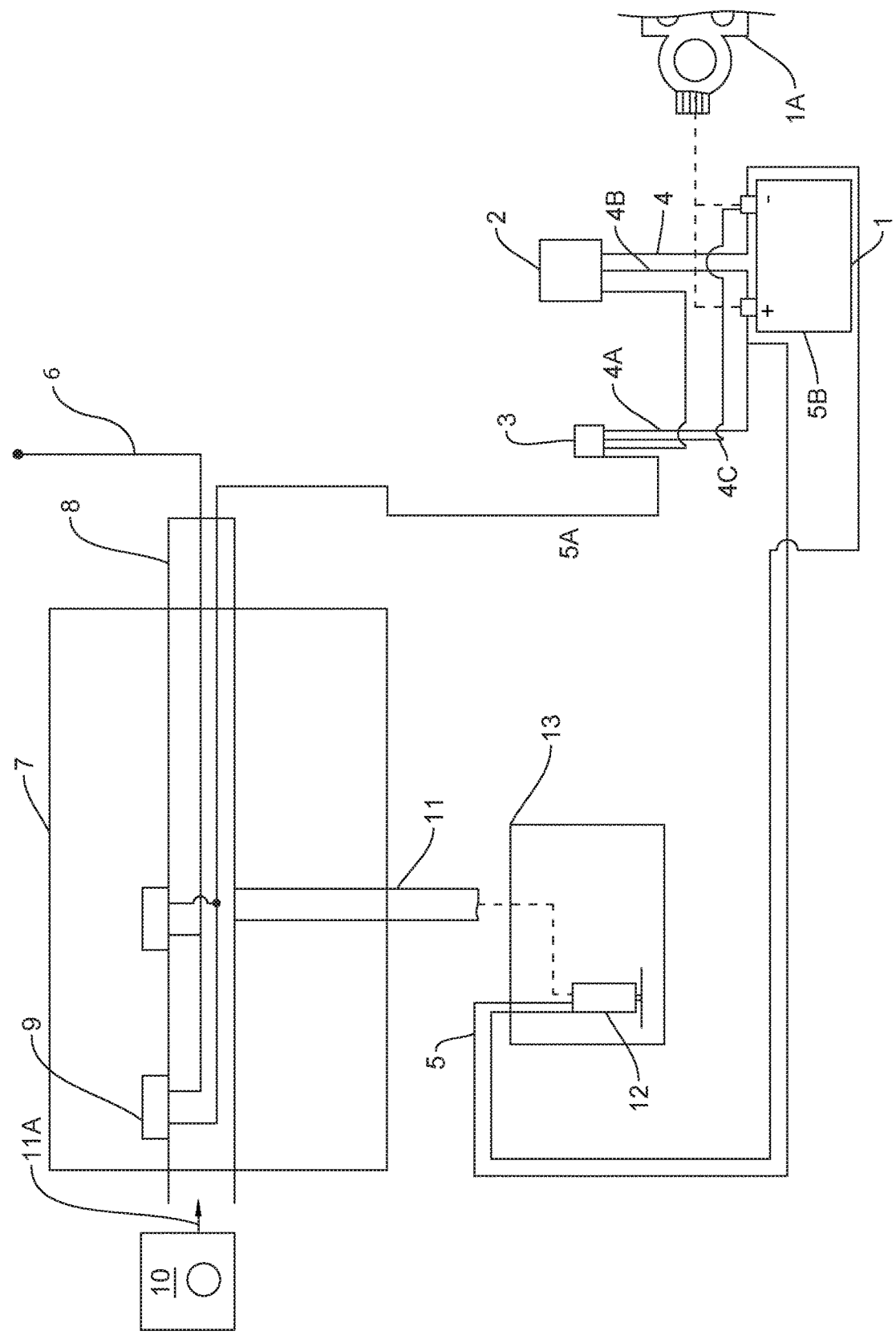
FIG. 4 is a schematic view of one embodiment of an aeroponics system of the present disclosure.

FIG. 4 provides a schematic view of one embodiment of an aeroponics system 18 of the present disclosure. A power source 1 is provided for powering the system. Power source 1 may be an automotive battery, for example, preferably having 12-volt D.C. voltage and a minimum of 330 cold crank amps ("CCA"), although it is contemplated that any suitable power source may be utilized. Power is transferred to aeroponics system 18 via battery terminal 1-A (shown in a close view in the drawing). Timing controller 2 receives power from power source 1 along line 4B and is in electrical communication with relay 3, which may be a 30 amp, four-prong relay. Wire 4 provides grounding for timing controller 2. In an exemplary embodiment of aeroponics system 18, timing controller 2 may be used to actuate injectors 9 every 50 milliseconds.

Also in electrical communication with power source 1 is fluid pump 12, which may be any suitable pump, including an in-line pump or a submersible pump delivering a nutrient solution that has been controlled for pH, nutrient levels, and the like, contained within reservoir 13. In the schematic shown, fluid pump 12 receives power along line 5. Pump ground wire 13 is also shown. Fluid pump 12 is in fluid communication with spray manifold 8 via conduit 11, which allows delivery of nutrient solution from reservoir 13, through conduit 11, and into spray manifold 8. Conduit 11 may be any suitable conduit such as, for example, a rubber hose. It is contemplated, however, that conduit 11 should be able to handle high-pressure delivery of the nutrient solution. Various wire connections and the like are provided in the exemplary embodiment of aeroponics system 18 and shown schematically in FIG. 4. For example, power is provided to relay 3 along line 4A. Relay 3 is grounded with wire 4C. Power is directed to injectors 9 along wire 5A. Injectors 9 are grounded via wire 6. A housing 7 constructed of plastic or other suitable material may be provided to contain some of the plant material fed by the aeroponics system. In-line pressure regulator 10 is also shown.

Figure 5:
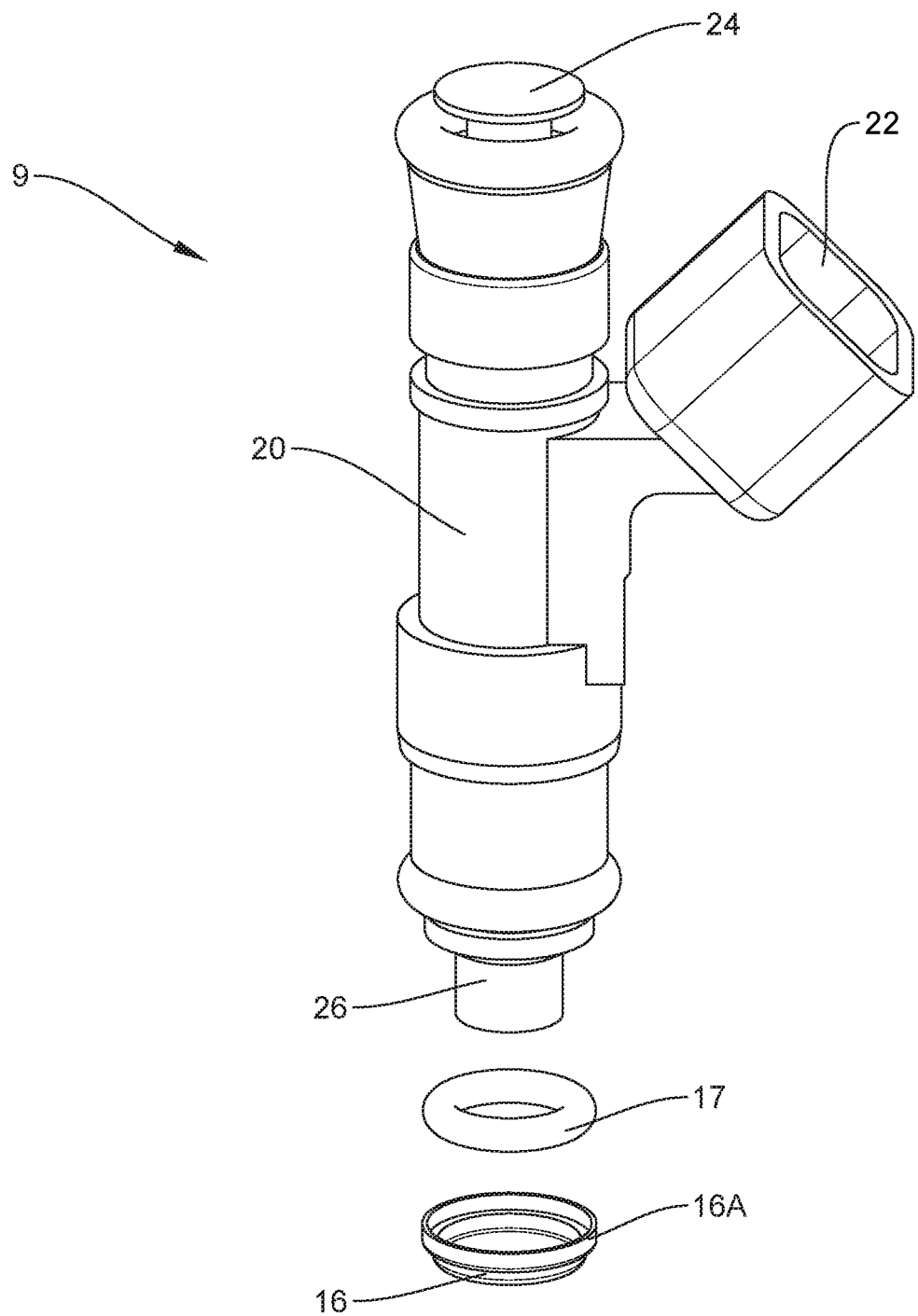
FIG. 5 is a side view of the general outline of one embodiment of an injector of the present disclosure, along with various components thereof.

FIG. 5 provides a closer view of one embodiment of an injector 9 of the present disclosure. The injector 9 depicted in FIG. 5, which is an exemplary injector suitable for use with the system of the present disclosure but which is not intended to be limiting, is similar in type to an automotive fuel injector. Injector 9 includes a housing 20, an electrical connection 22 for providing power to the injector, a fluid inlet 24, and a spray tip 26. Also provided in the embodiment of injector 9 shown in FIG. 5, as an optional component, is removable screen 16, which fits over spray tip 26 and is locked in place via a locking mechanism 16A. O-ring 17 is disposed along an interior surface of removable screen 16 to ensure proper sealing engagement between removable screen 16 and spray tip 26. The internal workings of injectors 9 are similar to those of an automotive fuel injector, and such workings are known. Briefly, an o-ring (not shown) at fluid inlet 24 seals the injector 9 to the spray manifold 8, so that there is no leakage between these components of the system within injector 9. A spring biases a pintle firmly against a pintle seat, obstructing the flow of fluid through injector 9. The pintle is attached to a rod that extends through a coil within the injector housing. When the coil is energized, the pintle is pulled up and away from the pintle seat, and the pressure of the fluid within the spray manifold forces fluid to rush through the injector to be sprayed onto plant material until the pintle once again closes off the spray tip. The timing controller regulates the timing of the energized injectors, the duration of energization, and the pattern of energization. The relay is provided to damp the load of the injectors. It is contemplated that in some embodiments of the present disclosure the timing controller may include a suitable relay.

Figure 6:
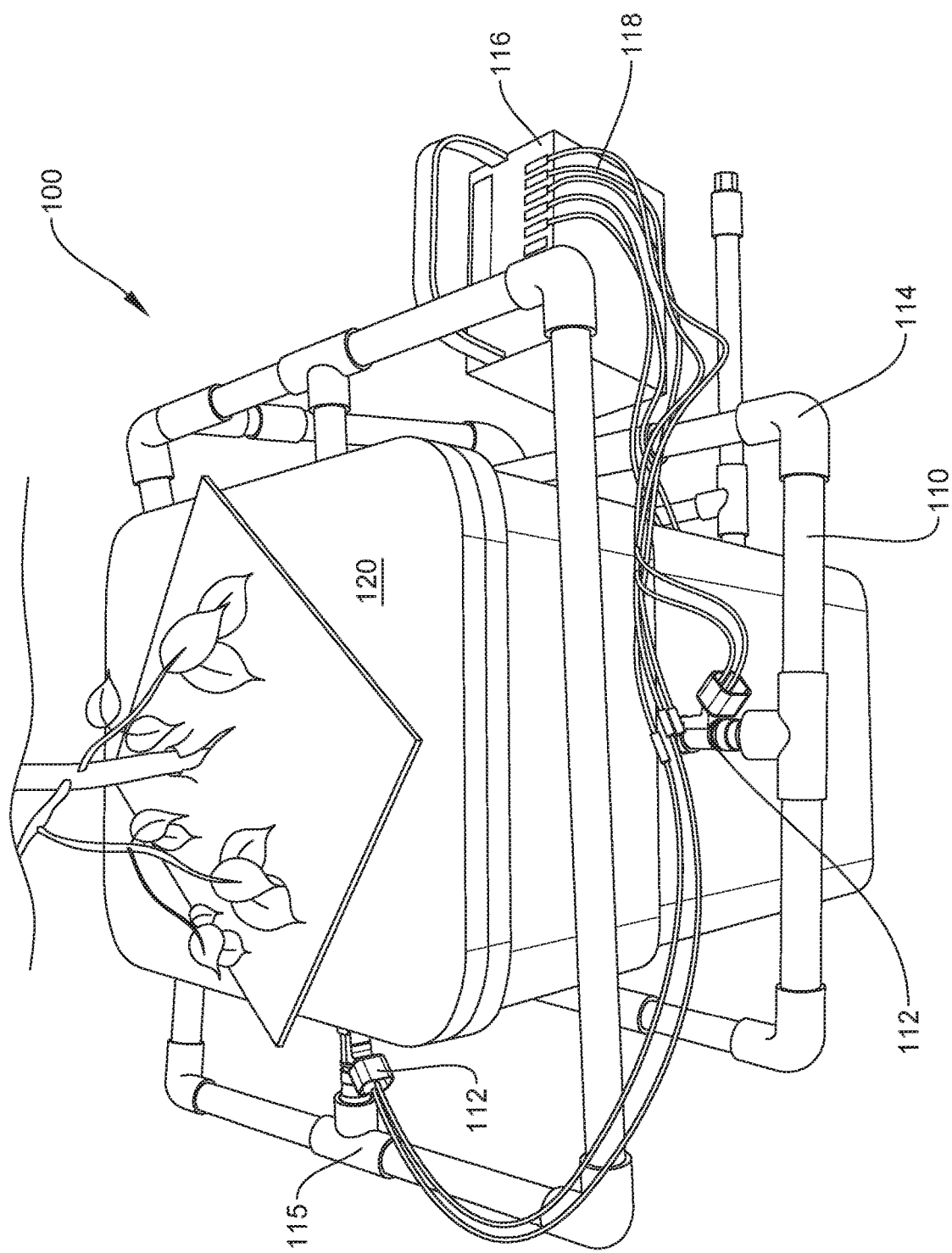
FIG. 6 is a perspective view of one embodiment 100 of the present system.

FIG. 6 is a perspective view of one embodiment of an aeroponics system 100 of the present disclosure. A plant is depicted situated within the system, though only an upper portion of the plant is visible, with the root system of the plant being disposed within enclosure 120. The aeroponics system 100 of FIG. 6 includes a power source, in this case an automotive battery 116 that delivers power to injectors 112. Power and grounding wires 118 are shown bundled and extending to the injectors 112. Each injector 112 received one power wire and one ground wire. Injectors 112 are affixed to a series of PVC pipes composed of linear portions 110, elbow portions 114, and t-portions 115. This system of PVC piping/conduits allows transport of nutrient-rich water throughout the system, ultimately for delivery to the roots of the plant exposed to the system within enclosure 120. It is contemplated that methods of connecting various portions of piping or conduit without leaking at the connections are well-known in the art, and such methods will not be described here.

Figure 7:
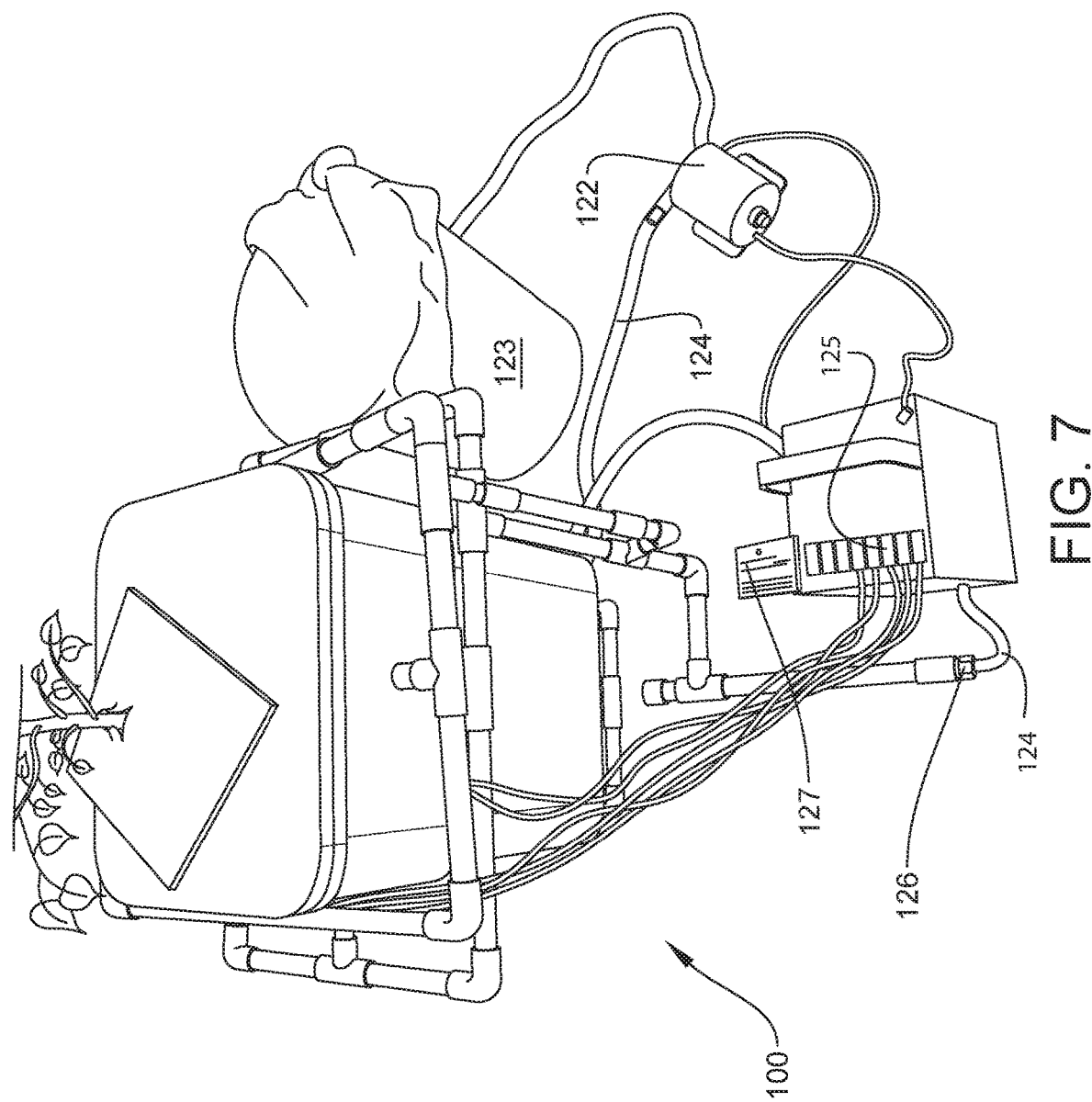
FIG. 7 is an alternate perspective view of the embodiment 100 of FIG. 6.

FIG. 7 is an alternate view of the aeroponics system 100 of FIG. 6, with fluid pump 122 visible. The pump shown is a 60 psi on-demand pump. Fluid conduit 124 is in communication with pump 122, and pump 122 is operable to force fluid through conduit 124 to connector 126, whereupon the fluid enters the assembly of PVC piping and is made available to the various injectors 112. The source of the fluid moving through conduit 124 is container 123. Also shown is time delay controller 127, which delays the power output to injectors 112, allowing the injectors to open and close at a set time, and for a set duration. Such time delay controllers are known. A suitable time delay controller is, for example, the Airtronics™ MC363 timer (Airtronics; Cazenovia, N.Y.).

Automotive battery 116 is also shown in FIG. 7. Battery 116 provides power to a relay (not shown) and then to bus 125. From bus 125, power is distributed to each of the injectors 112. Power is also provided from battery 116 to time delay controller 127, which is in electrical communication with the relay.

One embodiment of the present system includes sixteen-hole electric injectors. Such nozzles may be provided in the form of fuel injectors, for example. A sixteen-hole injector may have four central openings and twelve additional openings radiating around the outer edge of the nozzle plate. An example of such an injector 112 is a Bosch® 16-hole fuel injector (Robert Bosch GmbH; Stuttgart, Del.). An exemplary embodiment of the present system may incorporate fourteen to eighteen such injectors. It is contemplated, however, that any suitable type and number of injectors may be used with the present system. It is preferred that each injector of the present system may be controlled individually down to at least 0.5 milliseconds.

Figure 8A:
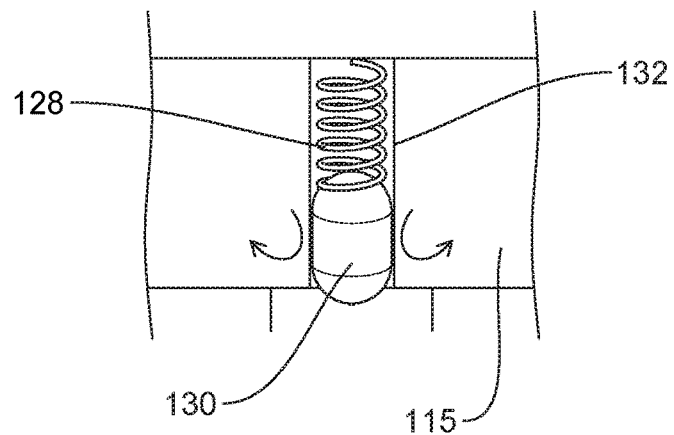
FIG. 8A is a cross-section view of one embodiment of a needle bearing and spring assembly of one embodiment of the present disclosure, with the needle bearing shown in 'closed position' in sealing engagement with an opening of the spray manifold.
Figure 8B:
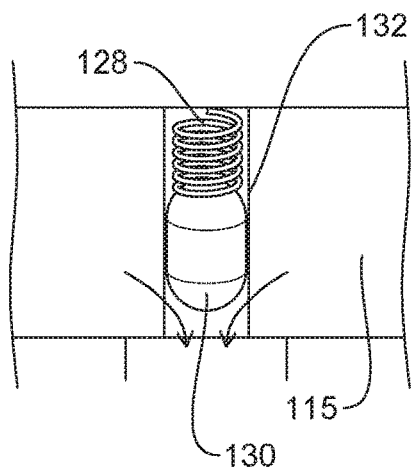
FIG. 8B is a cross-section view of the needle bearing and spring assembly of FIG. 8A, with the needle bearing shown in 'open' position away from the opening of the spray manifold.
Figure 9:
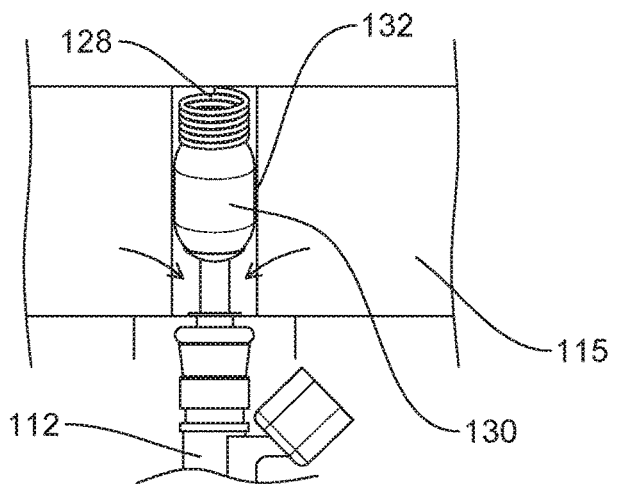
FIG. 9 is a cross-section view of the needle bearing and spring assembly of FIGS. 8A and 8B, with the needle bearing shown engaged by an injector.

In some embodiments of the present disclosure, spray manifold 8 may include a ball or needle bearing and spring assembly at each opening where an injector 9 attaches to the spray manifold 8. Such an embodiment is shown in FIGS. 8A, 8B, and 9. Spring 128 is contained within walls 132 and biases needle bearing 130 against the opening in spray manifold 8 through which fluid flows into an injector 9. When no injector is attached at a given opening, needle bearing 130 seals the opening in spray manifold 8, thereby preventing fluid from passing through the opening. This allows injectors 9 to be removed and replaced while the system is in operation, instead of having to drain spray manifold 8 prior to changing or removing an injector 9. When an injector 9 is attached to an opening, a seat 134 or other structure formed as part of spray manifold 8 (or, alternatively, attached at the end of the injector mating with spray manifold 8) engages needle bearing 130 as shown in FIG. 9 and pushes needle bearing 130 out of sealing engagement with the interior surface of spray manifold 8, thereby allowing fluid to flow into the injector 9. The attachment mechanism of an injector 9 to spray manifold 8 is preferably a “quick release” mechanism, such that one injector can be easily removed and another easily, and quickly, attached. While the needle or ball bearing/spring arrangement is shown and described herein, it is contemplated that any suitable mechanism for opening and closing an opening in spray manifold 8 to allow removal of an injector 9 while the device is in operation may be utilized, including various suitable valves.

One embodiment of the present system includes the following characteristics and components: eighteen-gauge wiring is preferably used to connect the various electrical components of the present system. Sixteen-hole electronic injectors include power and ground wires, where the power wire is wired onto a 30 amp four-prong relay supplying 12-volt DC and the necessary amperage to power the injector, while the ground is wired directly to the ground side of the battery or to its own ground. The 30 amp four-prong relay supplies power to the injector, also providing a ground for the timing controller. A constant power supply is wired to the 30-amp relay, as well as a constant ground. A signal received from the timer controller activates the 30-amp relay, passing the 12-volt DC. The number of injectors dictates how much amperage is drawn from the power source in order to activate the injectors.

The present system is advantageous in that the injectors used do not dislodge droplets of liquid from the plant roots being sprayed. This maintains a constant liquid supply for the plant and reduces waste in the system. User control of the injectors may further refine efficiency of the present system. It is contemplated that such control may be manual, or may be done via software, including one or more apps that allow a user to control the system remotely.

In some embodiments of the present disclosure a separate battery or power source may be provided to deliver current to the top and bottom of the plant being grown. The current may, for example, be around 10 amps. Bare wires may be used to deliver current to the top and bottom of the plant.

Some embodiments of the present disclosure may include one or more structures to separate the roots of the plant, or open up the root mass, to allow for more uniform delivery of solution from the spray nozzles to the roots of the plant. One or more hard plastic tubes may be used, for example. The tube(s) may extend through the root mass, providing separation of the root material. Any suitable structure (also referred to as a “root separator”) may be used for opening up or separating root material.

The foregoing description is intended to illustrate exemplary embodiments of the present disclosure and is not intended to be limiting. Various modifications to that which is disclosed herein will be readily apparent to those of skill in the art upon reading this disclosure. It is contemplated that such modifications remain with the spirit, and scope, of the present disclosure.

Having thus described the preferred embodiment of the invention, what is claimed as new and desired to be protected by Letters Patent includes the following:

1. An aeroponics system comprising:

a spray manifold comprising a fluid inlet;

a plurality of fluid injectors attached to said spray manifold and in fluid communication therewith, wherein the fluid injectors are fuel injectors;

a fluid pump in fluid communication with the fluid inlet of said spray manifold;

a timing controller in electronic communication with said plurality of fluid injectors; and a power source in electronic communication with said fluid pump, said plurality of fluid injectors, and said timing controller, wherein said fluid pump is configured to maintain a constant high pressure within said spray manifold, further wherein said timing controller is configured to control the timing and pattern of energization of said plurality of fluid injectors, and further wherein when any one of said plurality of fluid injectors is energized fluid is allowed to pass through said fluid injector and is sprayed from the tip thereof.

* * * * *